Patented Sept. 10, 1940

2,214,028

UNITED STATES PATENT OFFICE 2,214,028

MANUFACTURE OF YEAST

Ejnar Alfred Meyer, Epsom, England, assignor to Standard Brands Incorporated, New York, N. Y.

No Drawing. Application February 3, 1939, Serial No. 254,383. In Great Britain February 9, 1938

4 Claims. (Cl. 195—100)

The invention relates to a process for the manufacture of yeast. More particularly, it is concerned with the production of bakers' yeast in the form commonly known as compressed or pressed yeast, and includes correlated improvements and discoveries whereby such production is enhanced.

Heretofore the manufacture of yeast has entailed the starting with said yeast in a grain or a molasses wort, or a mixture of such worts. The growth of yeast therein requires an appropriate temperature and acidity or pH value, and a supply of nitrogen-containing and phosphorus-containing nutriments. These latter are usually furnished in the form of ammonium salts and as phosphates. An ammonium salt which has been frequently used is ammonium sulfate, but this presents a possible disadvantage or drawback because of a tendency of the ammonium sulfate to be reduced to sulfide, and it has been found desirable to add the ammonium sulfate in stages in order to avoid too great a change in the pH value of the liquid or nutrient medium.

An object of the present invention is the provision of a process in which the nutrient medium contains a nitrogen-containing nutriment in an improved form.

A further object of the invention is to provide a process in which the wort or nutrient medium contains a material which obviates or markedly reduces the disadvantages hereinbefore mentioned.

An additional object of the invention is to provide a process in which the nutrient medium is free from a compound which tends to form a sulfide.

Another object of the invention is to provide a process which enables a higher yield of yeast to be obtained.

A more particular object of the invention is the provision of a nutrient medium in which an ammonium salt of an aliphatic mono-carboxylic acid is present in the wort as a nitrogen-containing nutriment.

A specific object of the invention is the provision of a nutrient medium which contains ammonium acetate as a source of nitrogen.

Other objects of the invention will in part be obvious and will in part appear hereinafter.

The invention accordingly comprises the several steps and the relation of one or more of such steps with respect to each of the others, and the nutrient medium possessing the features which are exemplified in the following detailed disclosure, and the scope of the invention will be indicated in the claims.

In the practice of the invention there may be utilized as a nitrogen-containing nutriment an ammonium salt of an aliphatic mono-carboxylic acid, especially of such acid as is a member of the fatty acid series containing acetic acid, propionic acid, butyric acid and homologues thereof. The ammonium salt consequently may be that of acetic acid or a higher homologue of such acid. The procedure more particularly for the manufacture of yeast entails propagating yeast in a nutrient medium with aeration, said medium containing a yeast assimilable carbohydrate material which may be a grain wort, or a molasses wort, or a sugar-salt wort, and nitrogen-containing and phosphorus-containing nutriment materials. The phosphorus-containing nutriment may be present as a suitable phosphate, for example, a phosphate of calcium or of ammonium, and the nitrogen-containing nutriment is present at least in part as an ammonium salt of a saturated aliphatic mono-carboxylic acid, specifically, ammonium acetate, propionate, butyrate and the like.

Moreover, the inclusion of ammonium acetate in the wort may be in the form of the salt, i. e., as such, or it may be formed in situ by reaction between ammonia and acetic acid. The acetic acid utilized may be that which has been produced synthetically or by fermentation, such as vinegar. Utilization of ammonium acetate or an ammonium salt of a higher homologue of acetic acid may be as the sole nitrogen-containing nutriment or acetic acid and/or ammonium acetate may be used in conjunction with other inorganic nitrogen-containing nutriment material, or with another organic nitrogen-containing nutriment. The inorganic nitrogen may be ammonium sulfate and the organic nitrogen may be as a hydrolyzed protein product. It will be realized, of course, that ammonium acetate or the ammonium salt of a higher homologue of acetic acid may be incorporated in the wort in conjunction with other nutrient materials, such as phosphates and lactates.

As an illustrative embodiment of a manner in which the invention may be practiced, the following examples are presented:

Example 1

300 kgs. of molasses were diluted with water to 1900 lts. and were clarified in the usual way known in the art.

At the beginning of the fermentation the fermentation vessel was charged with 3500 lts. of water containing 10 per cent of the diluted molasses. Then a suitable amount of seed yeast was added and aeration was started and the remainder of the molasses was added gradually or at intervals in suitable amounts together with the usual nutrients. 7 litres of acetic acid (of 90% strength) and 2 litres of 25 per cent ammonium hydroxide were then added and thereafter during the fermentation a further 45 litres of the ammonium hydroxide and 100 litres of acetic acid were added at intervals to supply the necessary nitrogen and to maintain the requisite hydrogen ion concentration. The resulting yield of yeast of excellent quality was 130 per cent calculated on the quantity of molasses originally taken, thus showing that a considerable amount of the acetic acid had been assimilated as yeast food.

*Example 2*

The same amount of molasses was taken as in Example 1 and the fermenting vessel was charged as in Example 1, and the same amount of seed yeast was added. Aeration was started and the remainder of the molasses together with nutrients was added also as in Example 1. 10 kgs. of ammonium acetate were added at the start and a further 2 kgs. were added from time to time as chemical analysis of the fermenting wort showed a lowering of the nitrogen content. In addition 40 litres of strong acetic acid, 25 litres of 25 per cent ammonium hydroxide, 2 kgs. of ammonium sulfate and 0.2 kg. of sulfuric acid of 93% strength diluted with water were added as required during the fermentation period to maintain the requisite hydrogen ion concentration. The resulting yield of yeast of excellent quality was 105 per cent calculated on the quantity of molasses originally taken.

The manufacture of yeast in accordance with the foregoing procedures, and particularly when using ammonium acetate as nitrogen-containing nutriment, has been found to provide surprisingly good results although the ammonium acetate is a more expensive material than is ammonium sulfate. An advantage considered to be of importance and which arises from the use of ammonium acetate is the improved yield of yeast which is believed to be due to this salt serving not only as a source of nitrogen but also acting like a carbohydrate in building up the structure of the yeast.

Other advantages attending the production of yeast in accordance with the present invention are the absence of a tendency to form sulfides; a preservative effect upon the yeast; and a ready control of the pH value of the liquid or nutrient medium during the propagation or yeast growth. It may be pointed out also that the full amount of the ammonium acetate or like salt may be added at the starting of the procedure if such is desired. It follows, of course, that the salt may also be added fractionally.

Since certain changes in carrying out the above process, and certain modifications in the nutrient medium which embody the invention may be made without departing from its scope, it is intended that all matter contained in the above description shall be interpreted as illustrative and not in a limiting sense.

Having described my invention, what I claim as new and desire to secure by Letters Patent is:

1. A yeast manufacturing nutrient medium containing an ammonium salt of an aliphatic mono-carboxylic acid belonging to the group consisting of acetic, propionic and butyric as a nitrogen-containing nutriment in s u b s t a n t i a l amount.

2. A yeast manufacturing nutrient medium containing ammonium acetate as a nitrogen-containing nutriment in substantial amount.

3. A yeast manufacturing nutrient medium containing an ammonium salt of an aliphatic mono-carboxylic acid belonging to the group consisting of acetic, propionic and butyric as the nitrogen-containing nutriment in substantial amount.

4. A yeast manufacturing nutrient medium containing ammonium acetate as the nitrogen-containing nutriment in substantial amount.

EJNAR ALFRED MEYER.